United States Patent [19]

Ledeen et al.

[11] Patent Number: 4,540,025
[45] Date of Patent: Sep. 10, 1985

[54] THROTTLING BALL VALVE

[75] Inventors: Howard L. Ledeen, Pasadena; William P. Ledeen, Cupertino, both of Calif.

[73] Assignee: Grove Valve and Regulator Company, Oakland, Calif.

[21] Appl. No.: 479,796

[22] Filed: Mar. 28, 1983

[51] Int. Cl.³ .............................................. F16K 47/02
[52] U.S. Cl. ................................ 137/625.32; 251/127
[58] Field of Search ............... 251/127, 118, 207, 209; 137/625.32

[56] References Cited

U.S. PATENT DOCUMENTS

| 1,824,168 | 9/1931 | Orton | 251/118 |
| 2,920,858 | 1/1960 | Hunter | 251/118 |
| 3,352,155 | 11/1967 | Penet | 251/209 X |
| 4,111,229 | 9/1978 | Christian | 251/209 X |
| 4,295,632 | 10/1981 | Engelke | 251/127 |

FOREIGN PATENT DOCUMENTS 552453  3/1977  U.S.S.R. .............................. 251/118

Primary Examiner—Arnold Rosenthal
Attorney, Agent, or Firm—Melvin R. Stidham

[57] ABSTRACT

A throttling ball valve with an array of closed spaced horizontal plates secured across the flow passage through the ball. The leading edges of the plates are streamlined so that the flow stream will be divided into a plurality of laminar flow streams, each with a boundary layer across a surface of the plate. Energy is absorbed in the boundary layer phenomenon. The array of horizontal plates is preferably contained in a cylindrical sleeve which is inserted and secured into the cylindrical flow passageway through the valve ball.

4 Claims, 9 Drawing Figures

THROTTLING BALL VALVE

BACKGROUND OF THE INVENTION

Plug valves, including ball valves, which are rotated through ninety degrees between their full open and closed positions, have long been used for flow control purposes. If the plug is intermediate its extreme positions, i.e. partially open, it provides two orifices in series, which are connected by a fixed volume. This throttles gas flow through the valve and is particularly effective where a low pressure differential exists across the valve element. There are, however, many services wherein the valve is required to absorb large amounts of energy and to effect substantial pressure drops. This could occur, for example, in the case of pipeline gas flow to a storage tank or to atmosphere or in a variety of flow control requirements involving high rangeability.

Conventional ball and plug valves create very high fluid velocities when throttling under high differential conditions, and these high velocities may result in turbulence, cavitation and noise at excessive and damaging levels.

OBJECTS OF THE INVENTION

It is an object of this invention to provide a throttling valve with means for effectively limiting velocity.

It is a further object of this invention to provide means for enabling the use of a conventional plug valve to throttle gas flow through a substantial pressure differential while limiting velocities therethrough so as not to exceed a safe level.

It is a further object of this invention to provide a conventional plug valve to be used as an effective control valve under high differential pressure and high flow conditions.

It is a further object of this invention to adapt a conventional ball valve to alter its performance curve radically so as to provide significantly closer control over flow rate.

Other objects and advantages of this invention will become apparent from the description to follow, particularly when read in conjunction with the accompanying drawings.

SUMMARY OF THE INVENTION

In carrying out this invention, a series of generally parallel plates are disposed across the through-passage of a conventional plug or ball valve. The plates are closely spaced and their forward edges are streamlined to function as air foils wherein boundary layers are created across the surfaces thereof. These boundary layers of relatively stationary gas further confines the effective flow space between the plates and produces a frictional drag on gas flow between them. Because of the multiplicity of narrow flow channels, each with fully developed boundary layers, the valve creates an high impedance. Much of the pressure head across the valve is converted to frictional energy losses, rather than high velocity. Consequently, the valve generates little noise, is free from damaging cavitation and exhibits a flow characteristic more suitable to stable control. At the same time, many of the advantages of the ball type valve are retained. The air foils are conveniently disposed and welded across a sleeve so that they may be installed as a unit in the flow passageway of the ball valve.

DESCRIPTION OF PREFERRED EMBODIMENTS

Figure 1:
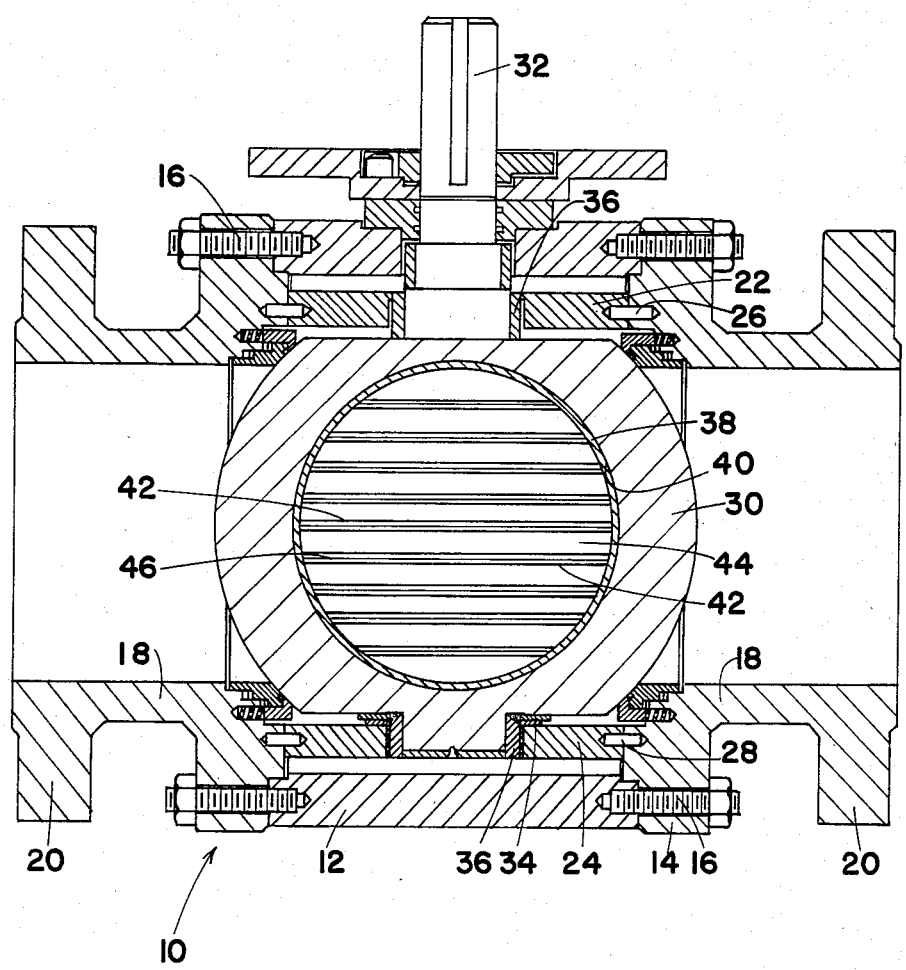
FIG. 1 is a vertical section view through a ball valve embodying features of this invention.
Figure 2:
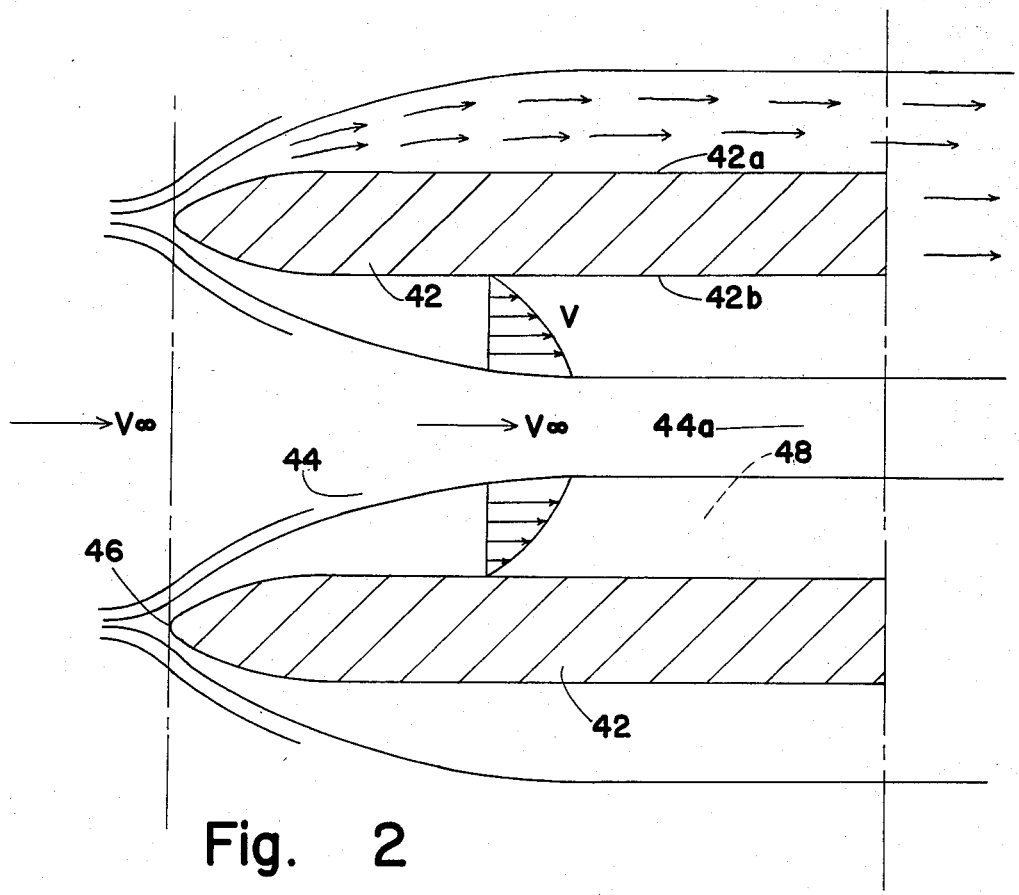
FIG. 2 is an enlarged partial section view schematically illustrating through a pair of parallel plates the generation of boundary layers.
Figure 3:
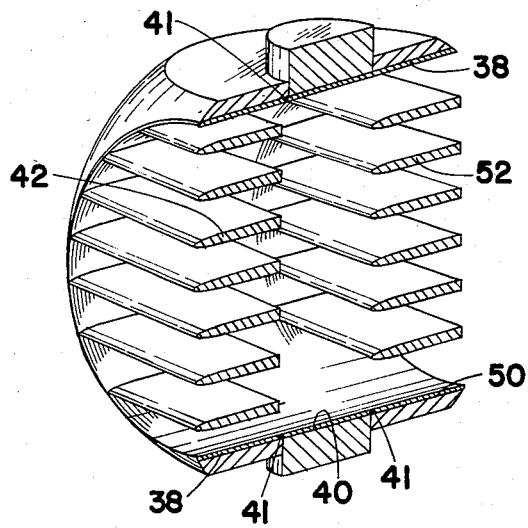
FIG. 3 is a view in perspective in section illustrating one arrangement of air foil plates.

The Embodiment of FIGS. 1 to 3

Referring now to FIG. 1 with greater particularity, the ball valve 10 of this invention includes a valve body which may comprise an annular body band 12 to the ends of which end closures 14 are secured, as by means of bolts 16. Integral with the end closures are hubs 18 and suitable means, such as mounting flanges 20, for securing the valve into a pipeline (not shown).

Top and bottom bearing blocks 22 and 24 are positioned as by means of pins 26 and 28 and clamped between the end closures 14. The bearing blocks rotatably receive a rotatable plug, such as the sphere 30 shown, same being rotatable between the fully closed position shown in FIG. 1 and a fully open position ninety degrees therefrom, as by means of a stem 32, rotation of the ball 30 being facilitated by thrust and rotary bearings 34 and 36.

As a special feature of this invention, a cylindrical sleeve insert 38 is secured in the conventional, cylindrical through-passageway 40 of the valve ball 30. The cylindrical insert may be secured by any suitable means, such as a weld 41 (FIG. 3). Welded or otherwise secured within the sleeve 38 is a series of closely spaced plates 42 with confined flow passages 44 between them. The provision of a sleeve 38 to contain the air foil plates, rather than installing the plates separately, greatly facilitates handling during manufacturing, particularly in the larger ball valve sizes.

Referring now to FIG. 2, the plates 42 divide a gas stream impinging upon them, and their leading edges 46 are streamlined so that the gas flows smoothly over the top and bottom surfaces 42a and 42b. With the air foil configuration 46 the gas flowing over them generates a boundary layer illustrated by the velocity V arrows in FIG. 2 wherein there is a boundary layer, i.e. a sheet of zero velocity, along the surfaces 42a and 42b. Also as illustrated, the laminar flow over the air foils 46, 42 extends to some thickness on both surfaces 42a and 42b, leaving an extremely restricted flow path 44a between the laminar flow zones 48. Thus, the fully developed fluid boundary layers V create high impedence so that much of the pressure head across the restricted flow paths 44a is converted to frictional energy losses, rather than high velocity.

Referring now to FIG. 3 specifically, the cylindrical insert or sleeve 38 may extend only partially through the flow passageway 40, or it may extend completely through the passageway. In some cases, two inserts 38 and 50 may be employed, with the air foil plates 52 on the downstream insert 50 staggered with respect to those on the upstream 38, whereby there is a further division of flow streams creating another energy-absorbing change in flow direction, as well as subsequent further energy losses resulting from frictional drag over the second set of air foil plates 52.

Figure 4:
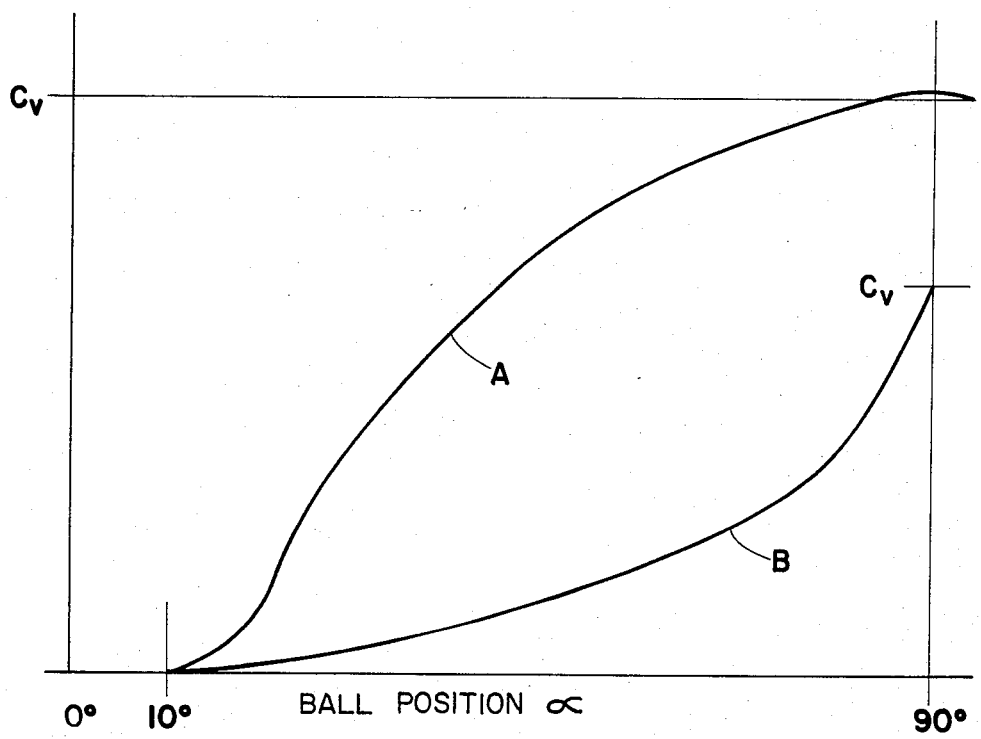
FIG. 4 is a graph which illustrates the improved performance curve of a ball valve modified in accordance with this invention.

As shown in FIG. 4, the provision of air foil plates radically alters the performance curve of a ball valve. In the conventional valve there is an initial sharp rise in flow rate $C_V$ as the valve is first opened, as shown by curve A, and this increase with valve angle continues at a steep rate until the valve is near full open. With the boundary layer influence of this invention, the flow rate increases at a low rate until the valve approaches full open, as shown by curve B. Even at full open there is a significantly reduced $C_V$. The performance characteristics illustrated by curve B provide much closer control over flow rate than is possible with a conventional ball valve.

Figure 5:
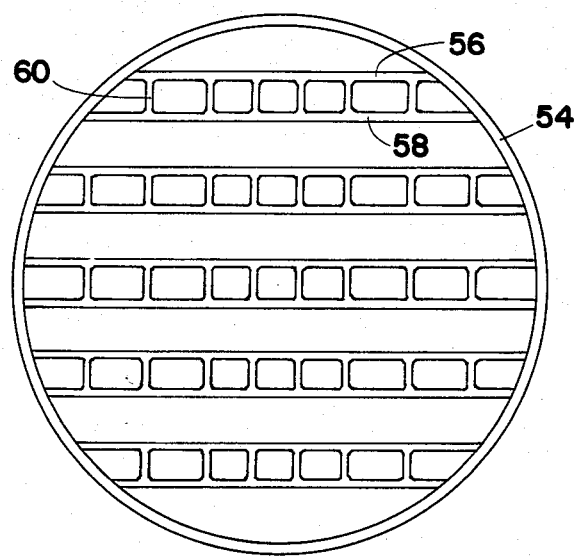
FIG. 5 is an end view of another form of air foil embodiment to be secured in the flow passageway of a plug valve.

The Embodiment of FIG. 5

In this embodiment, the sleeve insert 54 has a plurality of pairs of parallel air foil plates 56 and 58, which are interconnected by a series of vertical vanes 59. As in the embodiment of FIGS. 1 to 3, the parallel plates may have a streamlined leading edge 62 to generate the boundary layer above described, and in addition, the vanes themselves 60 may have streamline leading edges 64 to generate boundary layers along the sides thereof. Hence, the vanes 60 provide additional frictional drag and also produce changes in flow direction in the flow passageways between each adjacent vane 60 for further energy absorption.

Figure 6:
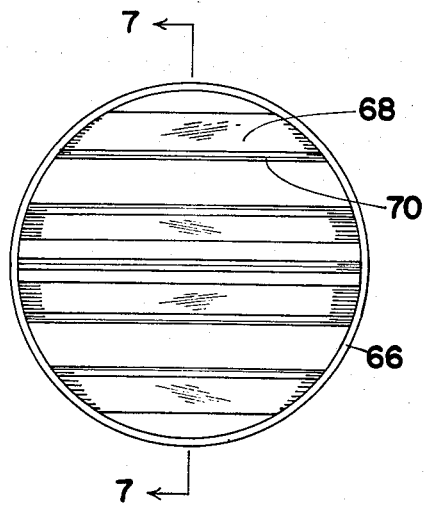
FIG. 6 is an end view of another form of air foil insert element.
Figure 7:
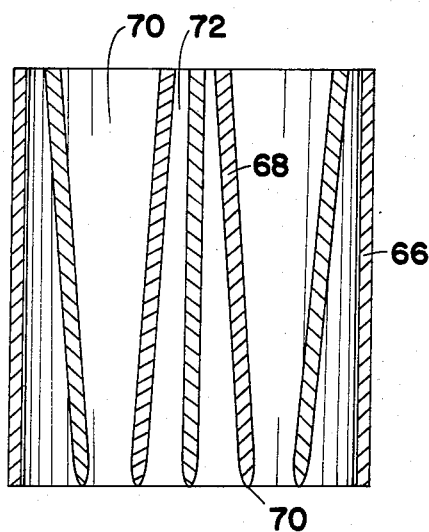
FIG. 7 is a section view taken along Line 7—7 of FIG. 6.

The Embodiment of FIGS. 6 and 7

Here, the sleeve insert 66 has a plurality of air foil plates 68, the leading edges 70 of which are disposed in parallel relationship. However, the parallel relationship is not maintained over the length of the plates 68 so that there are both diverging 70 and converging 72 flow passageways between the plates 68.

Figure 8:
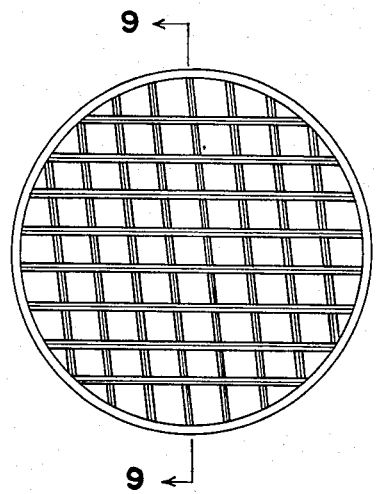
FIG. 8 is a front view of another air foil insert element.
Figure 9:
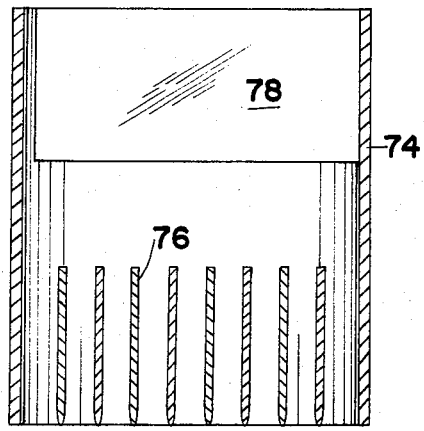
FIG. 9 is a section view taken along Line 9—9 of FIG. 8.

The Embodiment of FIGS. 8 and 9

In this embodiment, the insert sleeve 74 has two sets of parallel plates 76 and 78 which are disposed at angles to each other. For example, as shown, the leading plates 76 may be disposed normal to the axis of rotation of the ball 30, while the trailing edges 78 are disposed parallel thereto. Any angle between perpendicular relationship may also be chosen to provide desirable direction changes as well as frictional losses.

While this invention has been described in conjunction with preferred embodiments thereof, it is obvious that modification and changes therein may be made by those skilled in the art to which it pertains, without departing from the spirit and scope of this invention, as defined by the claims appended hereto.

We claim:
1. A throttling valve comprising:
   a valve body with aligned flow passages;
   a valve plug rotatable in said valve body intermediate said flow passages;
   a flow passageway through said valve plug; and
   means sealing between said body and said plug around said flow passageway;
   said valve being further characterized in that it includes:
   first array of a plurality of plates mounted across said passageway transverse to the axis of rotation of said plug and closely spaced to define a multiplicity of narrow flow channels between them;
   a second array of a plurality of plates mounted across said passageway downstream of said first array thereof;
   the leading edges of said plates being streamlined to divide smoothly a fluid stream impinging thereon and produce smooth laminar flow across and spaced from the surfaces of said plates with boundary layers adjacent to said surfaces, so that the boundary layers so generated produce a frictional drag on fluid flow and further confine the effective flow space between each pair of adjacent plates.
2. The throttling valve defined by claim 1 including:
   first and second sleeves snugly received in said passageway;
   each said array of plates being secured in one of said sleeves; and
   means securing each of said sleeves in said passageway.
3. The throttling valve defined by claim 1 wherein:
   corresponding plates of said first and second arrays thereof are coplanar.
4. The throttling valve defined by claim 1 wherein:
   corresponding plates of said first and second arrays thereof are in different planes whereby the arrays of plates are in staggered disposition.

* * * * *